United States Patent
Huss et al.

(10) Patent No.: US 11,159,206 B2
(45) Date of Patent: Oct. 26, 2021

(54) TRANSMISSION OF NR CONTROL INFORMATION IN AN LTE DOWNLINK SUBFRAME

(71) Applicant: Telefonaktiebolaget LM Ericsson (publ), Stockholm (SE)

(72) Inventors: Fredrik Huss, Sundbyberg (SE); Robert Baldemair, Solna (SE); Gary Boudreau, Kanata (CA); Franz Heiser, Järfälla (SE); Luke Williams, Scarborough (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 95 days.

(21) Appl. No.: 16/485,180

(22) PCT Filed: Mar. 21, 2019

(86) PCT No.: PCT/SE2019/050253
§ 371 (c)(1),
(2) Date: Aug. 12, 2019

(87) PCT Pub. No.: WO2020/190186
PCT Pub. Date: Sep. 24, 2020

(65) Prior Publication Data
US 2020/0358481 A1    Nov. 12, 2020

(51) Int. Cl.
*H04B 7/024*        (2017.01)
*H04W 72/04*        (2009.01)

(52) U.S. Cl.
CPC .......... *H04B 7/024* (2013.01); *H04W 72/042* (2013.01); *H04W 72/0446* (2013.01)

(58) Field of Classification Search
CPC . H04B 7/024; H04W 72/042; H04W 72/0446
(Continued)

(56) References Cited

U.S. PATENT DOCUMENTS

| 2018/0070369 A1 | 3/2018 | Papasakellarious |
| 2018/0316472 A1 | 11/2018 | John Wilson et al. |

(Continued)

FOREIGN PATENT DOCUMENTS

| EP | 3500003 A1 | 6/2019 |
| TW | 201822560 A | 6/2018 |

(Continued)

OTHER PUBLICATIONS

Orange et al., "Architecture Options in Rel-15", 3GPP TSG RAN#78, Lisbon, Portugal, Dec. 18, 2017, pp. 1-5, RP-172627, 3GPP.
(Continued)

*Primary Examiner* — Congvan Tran
(74) *Attorney, Agent, or Firm* — Coats & Bennett, PLLC (57) ABSTRACT

There is provided mechanisms for transmission of NR control information in an LTE downlink subframe. At least two symbols in the subframe are allocatable for LTE control information. A method is performed by a network node. The method comprises configuring resource elements for LTE transmission and resource elements for NR transmission within the subframe such that NR control information is allocated to resource elements of at least one symbol within the at least two symbols allocatable for the LTE control information in the subframe. The method comprises initiating transmission of the subframe from co-sited antennas, such that the resource elements for LTE transmission and the resource elements for NR transmission are transmitted from the co-sited antennas.

26 Claims, 7 Drawing Sheets

(58) Field of Classification Search
USPC .................................................. 455/328–329
See application file for complete search history.

(56) References Cited

U.S. PATENT DOCUMENTS

| | | | |
|---|---|---|---|
| 2018/0351591 A1* | 12/2018 | Fakoorian | H04B 1/1027 |
| 2019/0246394 A1* | 8/2019 | Asplund | H04W 36/0044 |
| 2019/0364520 A1* | 11/2019 | Kazmi | H04W 8/22 |
| 2019/0386807 A1* | 12/2019 | Kazmi | H04L 5/0078 |
| 2020/0068556 A1* | 2/2020 | Tiirola | H04L 5/0053 |
| 2020/0084698 A1* | 3/2020 | Rune | H04W 48/10 |
| 2020/0099560 A1* | 3/2020 | Li | H04W 28/06 |
| 2020/0169990 A1* | 5/2020 | Takeda | H04W 52/367 |
| 2020/0177287 A1* | 6/2020 | Yu | H04W 88/085 |
| 2020/0288501 A1* | 9/2020 | Takeda | H04W 72/12 |

FOREIGN PATENT DOCUMENTS

| | | |
|---|---|---|
| WO | 2018097680 A1 | 5/2018 |
| WO | 2018127339 A1 | 7/2018 |

OTHER PUBLICATIONS

3rd Generation Partnership Project, "3rd Generation Partnership Project; Technical Specification Group Radio Access Network; NR; Physical Layer Procedures for Data (Release 15)", Technical Specification, 3GPP TS 38.214 V15.3.0, Sep. 1, 2018, pp. 1-96, 3GPP.

* cited by examiner

Fig. 11 ated for LTE signalling.
TRANSMISSION OF NR CONTROL INFORMATION IN AN LTE DOWNLINK SUBFRAME

TECHNICAL FIELD

Embodiments presented herein relate to a method, a network node, a computer program, and a computer program product for transmission of New Radio (NR) control information in a Long Term Evolution (LTE) downlink subframe.

BACKGROUND

NR (New Radio) is the air interface specified for the fifth generation (5G) telecommunications systems according to the third generation partnership project 3GPP. NR might be regarded as a further development, with enhanced functionality and performance, of the LTE air interface.

Mobile network operators that deploy NR typically have access to, or have been allocated, existing frequency spectrum on multiple frequency bands where LTE signalling is currently deployed. Initially, the fraction of NR capable terminal devices might be limited comparted to LTE capable terminal devices and therefore a large part of the existing frequency spectrum might still need to be allocated for LTE signalling.

There are several architecture options for how to deploy NR together with LTE.

One option is to use LTE as the main air interface whilst NR is added using dual connectivity in non-standalone mode. With dual connectivity, both the LTE air interface and the NR air interface can be used in parallel for data transmission (and reception). In the downlink (i.e., in the direction from radio access network node on the network side towards terminal device on the user side) the data transmission is split at the Packet Data Convergence Protocol (PDCP) layer and can use either one of the air interfaces (i.e., LTE or NR) or both. In uplink (i.e., in the direction from terminal device on the user side towards radio access network node on the network side) the data received from the two air interfaces are combined in the PDCP layer at the radio access network node.

One drawback when NR is added using dual connectivity in non-standalone mode is that both LTE and NR air interfaces need to be active in the terminal devices in order for NR signalling to be enabled. When the terminal device transmits data in the uplink it must thus share transmit power between the LTE and NR air interfaces.

Furthermore, there exist certain restrictions of how power can be shared. For example, to save cost and complexity it can be desirable to use a single power amplifier at the terminal device, which means that uplink transmissions must be time multiplexed between LTE and NR. This puts limitations on how traffic can be steered between LTE and NR, especially since hybrid automatic repeat request (hybrid ARQ or HARQ) and radio link control (RLC) information needs to be sent in the uplink on both air interfaces. Furthermore, since the traffic is split at the PDCP layer in the downlink it can be difficult to determine the capacity for each air interface in order to avoid queueing delays and large latency.

Another option is therefore to use NR only in standalone mode. This means that NR capable terminal devices would only use frequency spectrum for signalling where NR is deployed when communicating over the NR air interface. This could reduce complexity in the terminal devices as well as in the network and avoid issues with dual connectivity, such as sharing of transmission power. To have even more efficient frequency spectrum utilization, it is possible to overlay an NR carrier in the same frequency spectrum as an LTE carrier. This is made possible by flexible locations of control channels and signals, and by rate matching around common reference signals (CRS) and synchronization signals (such as primary synchronization signals (PSSs), secondary synchronization signals (SSSs)), and physical broadcast channel (PBCH) that are always transmitted in an LTE carrier.

Figure 1:
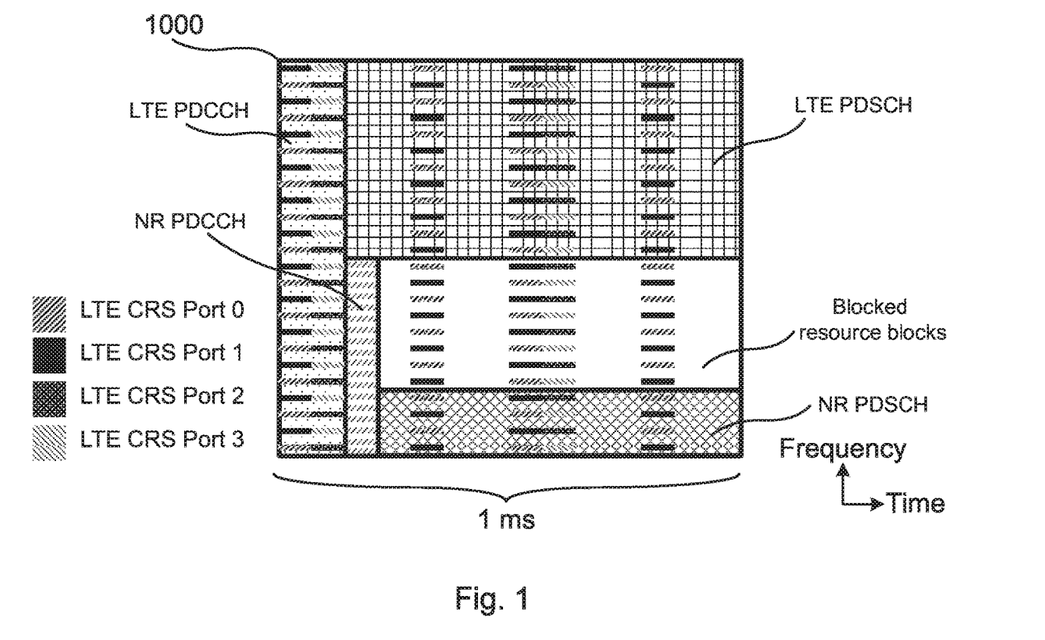
FIGS. 1 and 2 illustrate subframes for joint downlink NR and LTE transmission.

FIG. 1 illustrates a subframe 1000 for joint downlink NR and LTE transmission. In more detail, FIG. 1 illustrates the location of the LTE CRSs Port 0, Port 1, Port 2, and Port 3 as well as the physical downlink control channel (PDCCH) and the physical downlink shared channel (PDSCH) for NR and LTE in a subframe 1000. The LTE CRS is transmitted in symbols 0, 4, 7, and 11 in certain subcarriers. If the radio access network node has four antenna ports, the LTE CRS is also transmitted in symbols 1 and 8. The LTE PDCCH starts in symbol 0 and can occupy from 1 to 3 symbols for carrier bandwidths 3 MHz and higher. The LTE PDSCH starts in the next symbol after the LTE PDCCH. To avoid collisions with the LTE CRS, the NR PDCCH must be transmitted in symbol 2 with four LTE transmit antenna ports. The NR PDSCH can then start in symbol 3. Other locations for the NR PDCCH are possible, but the mandatory terminal device capability only includes PDCCH search spaces in the first three symbols. To avoid collisions between the LTE PDSCH and the NR PDCCH in symbol 2, they must be allocated on different resource blocks.

Figure 2:
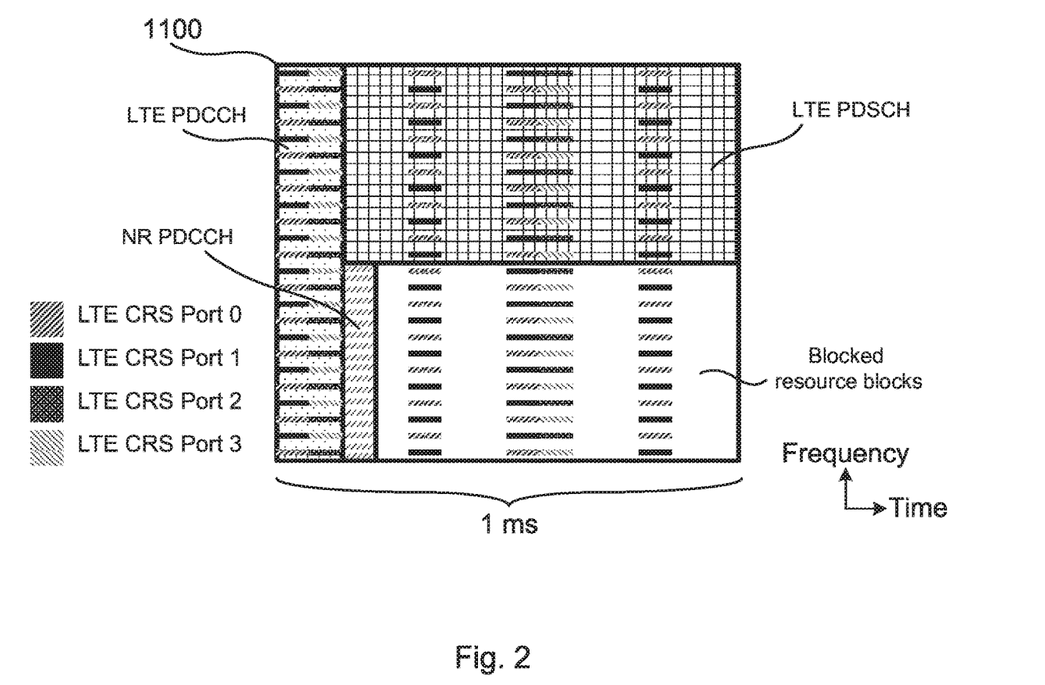

FIG. 2 illustrates another example of a subframe 1100 for joint downlink NR and LTE transmission. In more detail, FIG. 2 illustrates that LTE PDCCH is transmitted in symbols 0 and 1, and NR PDCCH is transmitted in symbol 2 of the subframe 1100. In FIG. 2 there is no NR PDSCH transmitted, which for example could be the case during scheduling of NR PUSCH in the uplink. Then the LTE PDSCH is still blocked from all resource blocks where NR PDCCH is transmitted.

From the above follows that the capacity for NR PDCCH will be limited to one symbol with four LTE transmit antenna ports at the radio access network node. Similarly, the capacity for NR PDCCH will be limited to two symbols with one or two LTE transmit antenna ports at the radio access network node. When the NR PDCCH is transmitted the corresponding resource blocks must be blocked for LTE PDSCH scheduling due to potential collisions between the LTE PDSCH and the NR PDCCH. Since the NR PDCCH is transmitted in one symbol, it will occupy many resource blocks, especially for terminal devices at cell edge. For example, for a 5 MHz carrier and NR PDCCH transmitted on one symbol, up to 4 control channel elements (CCEs) can be allocated for NR PDCCH. To schedule a single terminal device at the cell edge could require all 4 CCEs, leaving almost no resource blocks left for the LTE PDSCH. Furthermore, if the NR PDCCH is used to schedule uplink data there are no resource blocks used by the NR PDSCH. This means that all resource blocks that the NR PDCCH is using must be blocked for the LTE PDSCH.

Hence, there is still a need for improved joint downlink NR and LTE transmission.

SUMMARY

An object of embodiments herein is to provide efficient joint downlink NR and LTE transmission that does not suffer from the issues noted above, or at least where the issues noted above are mitigated or reduced.

According to a first aspect there is presented a method for transmission of NR control information in an LTE downlink subframe. At least two symbols in the subframe are allocatable for LTE control information. The method is performed by a network node. The method comprises configuring resource elements for LTE transmission and resource elements for NR transmission within the subframe such that NR control information is allocated to resource elements of at least one symbol within the at least two symbols allocatable for the LTE control information in the subframe. The method comprises initiating transmission of the subframe from co-sited antennas, such that the resource elements for LTE transmission and the resource elements for NR transmission are transmitted from the co-sited antennas.

According to a second aspect there is presented a network node for transmission of NR control information in an LTE downlink subframe, wherein at least two symbols in the subframe are allocatable for LTE control information. The network node comprises processing circuitry. The processing circuitry is configured to cause the network node to configure resource elements for LTE transmission and resource elements for NR transmission within the subframe such that NR control information is allocated to resource elements of at least one symbol within the at least two symbols allocatable for the LTE control information in the subframe. The processing circuitry is configured to cause the network node to initiate transmission of the subframe from co-sited antennas, such that the resource elements for LTE transmission and the resource elements for NR transmission are transmitted from the co-sited antennas.

According to a third aspect there is presented a network node for transmission of NR control information in an LTE downlink subframe, wherein at least two symbols in the subframe are allocatable for LTE control information. The network node comprises a configure module configured to configure resource elements for LTE transmission and resource elements for NR transmission within the subframe such that NR control information is allocated to resource elements of at least one symbol within the at least two symbols allocatable for the LTE control information in the subframe. The network node comprises an initiate module configured to initiate transmission of the subframe from co-sited antennas, such that the resource elements for LTE transmission and the resource elements for NR transmission are transmitted from the co-sited antennas.

According to a fourth aspect there is presented a computer program for transmission of NR control information in an LTE downlink subframe, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient joint downlink NR and LTE transmission.

Advantageously this provides joint downlink NR and LTE transmission that does not suffer from the issues noted above.

Advantageously this provides increased control channel capacity in the cases when the NR PDCCH would otherwise (as in FIGS. 1 and 2) block resource blocks that could be used for LTE PDSCH.

The increase in capacity is especially significant in cases when only small data packets are transmitted on NR PDSCH, when the terminal device is on the cell edge and the NR PDCCH requires many CCE, or when the NR PDCCH is used to schedule uplink data.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 3:
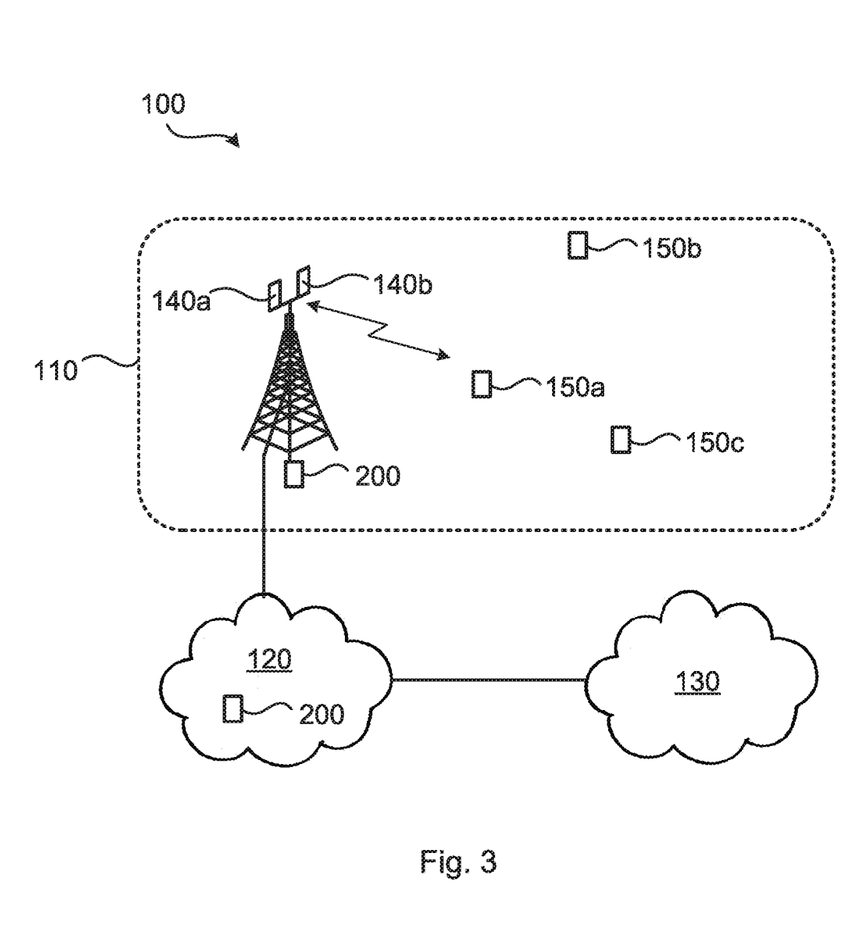
FIG. 3 is a schematic diagram illustrating a communications network according to embodiments.

FIG. 3 is a schematic diagram illustrating a communications network 100 where embodiments presented herein can be applied. The communications network 100 comprises a radio access network node, schematically illustrated by its antennas 140a, 140b, configured to provide network access over one or more radio propagation channels to terminal devices 150a, 150b, 150c, in a radio access network 110. Non-limited examples of terminal devices 150a, 150b, 150c are portable wireless devices, mobile stations, mobile phones, handsets, wireless local loop phones, user equipment (UE), smartphones, laptop computers, tablet computers, network equipped sensors, network equipped vehicles, and Internet of Things (IoT) devices. The radio access network node is controlled by a network node 200.

In some embodiments the radio access network node might be a radio base station, base transceiver station, node B (NB), evolved node B (eNB), gNB, access point, TRP, or the like. The radio access network no is operatively connected to a core network 120. The core network 120 is in turn operatively connected to a packet data network 130, such as the Internet. The terminal devices 150a, 150b, 150c are thereby, via the radio access network node, enabled to access services of, and exchange data with, the service network 130.

Terminal device 150a is an example of a high priority LTE terminal device. Terminal device 150b is an example of a cell edge LTE terminal device 150b. Terminal device 150c is an example of a terminal device joining the cell, and thus causing the number of served LTE terminal devices 150a, 150b, 150c in the cell to increase. At least one of the terminal devices 150a, 150b, 150c is configured also for NR operation.

As noted above there is a need for improved joint downlink NR and LTE transmission.

The embodiments disclosed herein relate to mechanisms for transmission of NR control information in an LTE downlink subframe. In order to obtain such mechanisms there is provided a network node 200, a method performed by the network node 200, a computer program product comprising code, for example in the form of a computer program, that when run on a network node 200, causes the network node 200 to perform the method.

Figure 4:
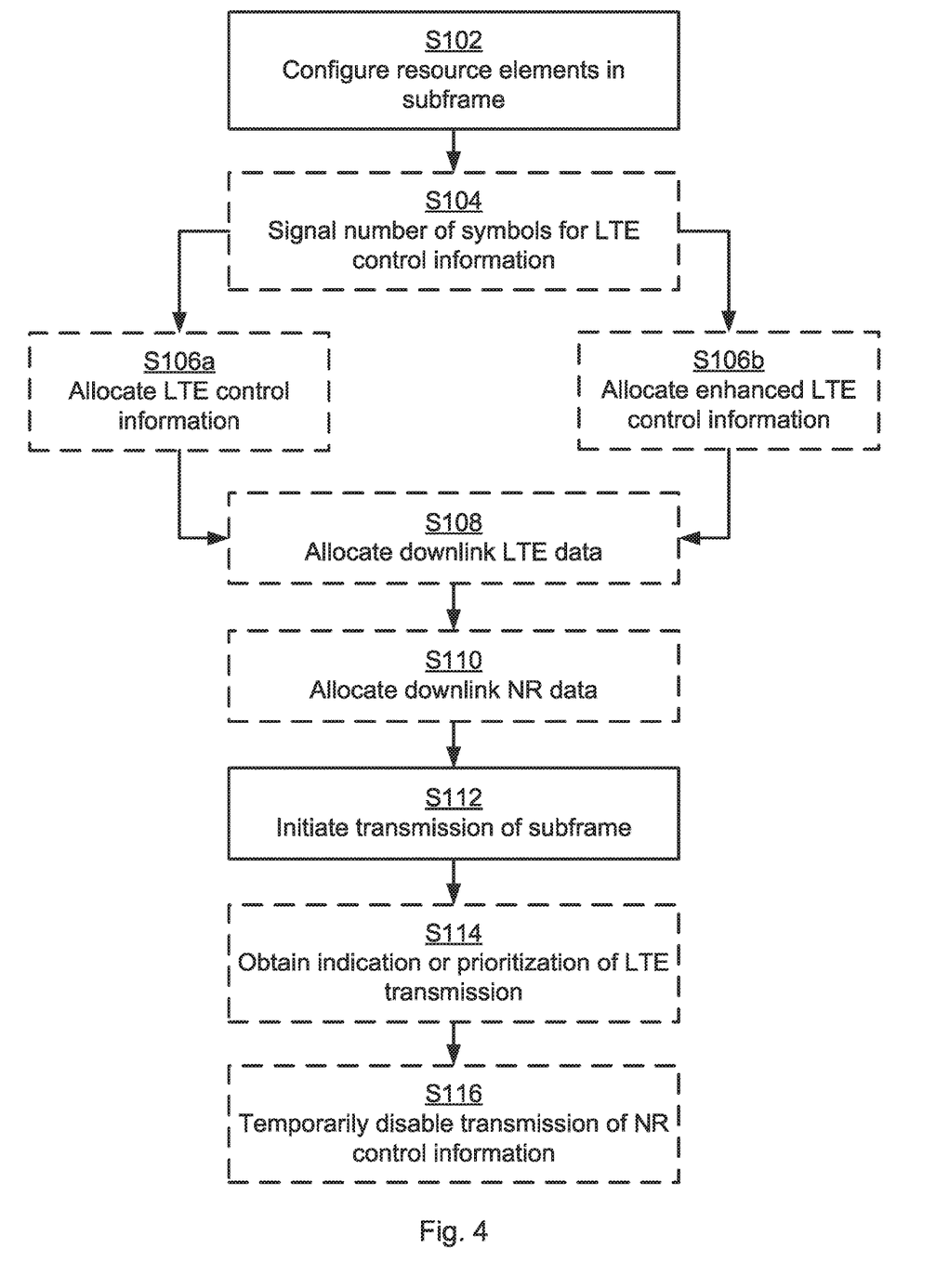
FIG. 4 is a flowchart of methods according to embodiments.

FIG. 4 is a flowchart illustrating embodiments of methods for transmission of NR control information in an LTE downlink subframe. At least two symbols in the subframe are allocatable for LTE control information. The methods are performed by the network node 200. The methods are advantageously provided as computer programs 920.

First the network node 200 configures resource elements for LTE and NR. In particular, the network node 200 is configured to perform step S102:

S102: The network node 200 configures resource elements for LTE transmission and resource elements for NR transmission within the subframe. The resource elements are configured such that NR control information is allocated to resource elements of at least one symbol within the at least two symbols allocatable for the LTE control information in the subframe.

Transmission of the subframe is the initiated. In particular, the network node 200 is configured to perform step S112:

S112: The network node 200 initiates transmission of the subframe from co-sited antennas 140a, 140b. The transmission is initiated such that the resource elements for LTE transmission and the resource elements for NR transmission are transmitted from the co-sited antennas 140a, 140b.

Thereby, one or more of the symbols in the subframe allocatable for LTE control information might be occupied by resource elements for NR transmission. In other words, the length of LTE PDCCH might be extended so that it is overlapping with the NR PDCCH to decouple NR PDCCH resource blocks and LTE PDSCH resource blocks, in turn avoiding blocking of LTE PDSCH by NR PDCCH.

Embodiments relating to further details of transmission of NR control information in an LTE downlink subframe as performed by the network node 200 will now be disclosed.

There could be different types of LTE control information and NR control information. In some examples, the LTE control information is provided in an LTE Physical Downlink Control Channel (PDCCH). Further, in some examples, the NR control information is provided in an NR Physical Downlink Control Channel (PDCCH).

There could be different types of symbols. In some examples, the symbols are Orthogonal Frequency-Division Multiplexing, OFDM, symbols. In LTE the first one to three OFDM symbols of a sub-frame might be assigned to the control region, that should carry the PDCCH. These OFDM symbols are referred to as allocatable for the LTE control information. The PDSCH should follow in the OFDM symbols following upon the control region.

There could be different ways for the network node 200 to initiate transmission of the subframe in step S112. In some examples, the resource elements of LTE and the resource elements for NR transmissions are combined on each antenna of the co-sited antennas 140a, 140b. In some examples, the resource elements for LTE transmission are transmitted from a first antenna 140a of the co-sited antennas 140a, 140b and the resource elements for NR transmission are transmitted from a second antenna 140b of the co-sited antennas 140a, 140b.

There could be different number of symbols allocatable for LTE control information in the subframe. In some examples, exactly three symbols are allocatable for LTE control information in the subframe.

Depending on how many symbols are allocatable for LTE control information in the subframe, there could be alternative numbers of symbols for the NR control information. In some examples, the NR control information is allocated to resource elements of a single one symbol within the at least two symbols allocatable for the LTE control information in the subframe. In some examples the NR control information is allocated to resource elements of exactly two symbols within the at least two symbols allocatable for the LTE control information in the subframe.

For examples, in case of two transmit antennas 140a, 140b, it would be possible to have exactly three symbols allocatable for LTE control information and where the NR control information is allocated to resource elements of the two last of these three symbols.

There could be different ways for the resource elements configured with the NR control information to be placed within the at least two symbols allocatable for the LTE control information in the subframe. In some aspects the NR control information makes use of the last of the symbols allocated for LTE control information. In particular, according to an embodiment, the resource elements configured with the NR control information occupy the at least one last occurring symbol within the at least two symbols allocatable for the LTE control information. That is, in case the resource elements are configured such that NR control information is allocated to resource elements of only one single symbol, then the resource elements to which the NR control information occupy the very last occurring symbol within the at least two symbols allocatable for the LTE control information. Further, in case the resource elements are configured such that NR control information is allocated to resource elements of only two symbols, then the resource elements to which the NR control information occupy the two very last occurring symbols within the at least two symbols allocatable for the LTE control information In some aspects the network node 200 informs terminal devices 150a, 150b, 150c in the cell about the number of symbols in the subframe that are allocatable for LTE control information in the subframe. Hence, according to an embodiment, the network node 200 is configured to perform (optional) step S104:

S104: The network node 200 signals how many symbols in the subframe that are allocatable for LTE control information in the subframe.

How many symbols in the subframe that are allocatable for LTE control information in the subframe might be signalled by a control format indicator (CFI). Thus, CFI=2 or CFI=3 might be signaled depending on the scenario.

As noted above, at least two symbols in the subframe are allocatable for LTE control information. Hence, according to an embodiment, the network node 200 is configured to perform (optional) step S106a:

S106a: The network node 200 allocates LTE control information to resource elements of the at least two symbols allocatable for the LTE control information.

The NR control information might not be allocated to all resource elements of the at least one symbol within the at least two symbols allocatable for the LTE control information in the subframe. In some aspects each symbol within the subframe is composed of sub-carriers. Particularly, according to an embodiment, the NR control information is allocated to resource elements of less than all sub-carriers of the at least one symbol.

In further aspects, when overlapping between the LTE PDCCH and NR PDCCH is used, some resource elements will be occupied by both LTE PDCCH and NR PDCCH transmissions. To ensure that the terminal devices 150a, 150b, 150c can receive these channels (and hence the LTE control information and/or the NR control information) with sufficient quality as needed, a number of adaptations could be made. Aspects, examples, and embodiments, of such adaptations will be disclosed next.

In some aspects, puncturing or downscaling of the LTE PDCCH is performed for the overlapping resource elements to increase the quality of NR PDCCH, at the cost of degraded quality of the LTE PDCCH. Particularly, according to an embodiment, the LTE control information is truncated such that no LTE control information is allocated to resource elements of the sub-carriers of the at least one symbol to which the NR control information is allocated. In some aspects the truncation implies that no LTE control information is allocated only to the part of the at least one symbol where NR PDCCH is transmitted. However, in other aspects the truncation implies that no LTE control information is allocated in the whole at least one symbol where NR PDCCH is transmitted. Further, according to an embodiment, transmission power of the LTE control information is scaled such that less transmission power is used for the LTE control information allocated to resource elements of the sub-carriers of the at least one symbol to which the NR control information is allocated than for the remaining LTE control information. Individual scale factors might be applied to LTE PDCCH and NR PDCCH and the sum of the scaled resource elements might then be transmitted. Further, the number of CCE that is allocated for LTE PDCCH and/or NR PDCCH to a terminal device 150a, 150b, 150c could be increased to get more robust channel coding.

In some aspects, power boosting of some resource elements for LTE PDCCH and/or NR PDCCH to a terminal device 150a, 150b, 150c is used to increase the received signal to noise ratio (SNR). Particularly, according to an embodiment, more transmission power is used for some of the remaining LTE control information than for other of the remaining LTE control information. Thereby, more transmission power might be used for some of the remaining LTE control information which does not share the same resource elements as the NR control information than for the remaining LTE control information which shares the same resource elements as the NR control information. Resource elements carrying NR PDCCH demodulation reference signals (DM-RSs) might be transmitted interference-free (i.e. without LTE PDCCH transmitted on these resource elements) or at least LTE PDCCH should be de-boosted on these resource elements. Further, according to an embodiment, more transmission power is used for some of the NR control information than for other of the NR control information.

In some aspects, LTE PDCCH is not transmitted. Hence, according to an embodiment, no LTE control information is allocated to resource elements of the at least two symbols allocatable for the LTE control information.

In scenarios where no LTE control information is allocated to resource elements of the at least two symbols allocatable for the LTE control information, enhanced LTE control information might instead be resource elements of symbols within the subframe. Particularly, according to an embodiment, the network node 200 is configured to perform (optional) step S106b:

S106b: The network node 200 allocates enhanced LTE control information to resource elements of symbols within the subframe and outside the at least two symbols allocatable for the LTE control information.

In some examples the enhanced LTE control information is provided in an LTE Enhanced Physical Downlink Control Channel (EPDCCH). Thereby, some or all downlink control information (DCI) messages for LTE can be transmitted on LTE EPDCCH instead of LTE PDCCH, since LTE EPDCCH is not overlapping with NR PDCCH and thus will not have degraded quality.

In some aspects, downlink LTE data is transmitted in the subframe. Thus, according to an embodiment, the network node 200 is configured to perform (optional) step S108:

S108: The network node 200 allocates downlink LTE data to resource elements of symbols within the subframe and outside the at least two symbols allocatable for the LTE control information.

The downlink LTE data might be transmitted in an LTE physical downlink shared channel (PDSCH). That is, in some examples, the downlink LTE data is provided in an LTE PDSCH.

In some aspects, downlink NR data is transmitted in the subframe. Thus, according to an embodiment, the network node 200 is configured to perform (optional) step S110:

S110: The network node 200 allocates downlink NR data to resource elements of symbols within the subframe and outside the at least two symbols allocatable for the LTE control information.

The downlink NR data might be transmitted in an NR physical downlink shared channel (PDSCH). That is, in some examples, the downlink NR data is provided in an NR PDSCH.

When downlink NR data is transmitted, it might be transmitted to not interfere with the downlink LTE data. In particular, the NR downlink data might be allocated to resource elements outside those sub-carriers to which the LTE downlink data is allocated.

Further, the sub-carrier spacing might be different for NR signalling and LTE signalling. For example, the sub-carriers for the NR downlink data might have a spacing of 15 kHz, 30 kHz, or 60 kHz.

In some aspects the overlap of NR PDCCH with the LTE PDCCH is at least temporarily disabled. In particular, according to an embodiment, the network node 200 is configured to perform (optional) steps S114 and S116:

S114: The network node 200 obtains an indication of prioritization of LTE transmission.

S116: The network node 200 temporarily disables transmission of the NR control information whilst performing prioritized LTE transmission.

Overlapping between LTE PDCCH and NR PDCCH might thus be dynamically enabled and disabled, by scheduling the LTE PDCCH accordingly.

Further aspects of prioritized LTE transmission will now be disclosed.

In some examples, the prioritization pertains to serving high priority LTE terminal devices 150a, serving cell edge LTE terminal devices 150b, or increasing number of served LTE terminal devices 150a, 150b, 150c.

Overlapping between LTE PDCCH and NR PDCCH might, for example, be disabled when scheduling terminal devices 150a with high priority, for example emergency calls.

Overlapping between LTE PDCCH and NR PDCCH might, for example, be disabled when scheduling terminal devices 150b on the cell edge, for example when increasing the number of CCE is not enough to get sufficient quality on the PDCCH for terminal devices 150b on the cell edge.

Overlapping between LTE PDCCH and NR PDCCH might, for example, be disabled if the capacity gain for LTE PDSCH is outweighed by the loss due to increasing the number of CCE and/or power boosting of PDCCH, for example in that fewer terminal devices 150a, 150b, 150c can be scheduled during periods of high traffic load.

Overlapping between LTE PDCCH and NR PDCCH might thus only be applied only when it is considered beneficial, e.g. when NR PDCCH otherwise would block resource blocks that could be used for LTE PDSCH and when the link quality for LTE PDCCH (or LTE EPDCCH), and NR PDCCH is sufficient.

In situations when it is determined that the NR PDCCH shall not be overlapped with the LTE PDCCH, the LTE PDCCH might occupy all the OFDM symbols of the control region.

Figure 5:
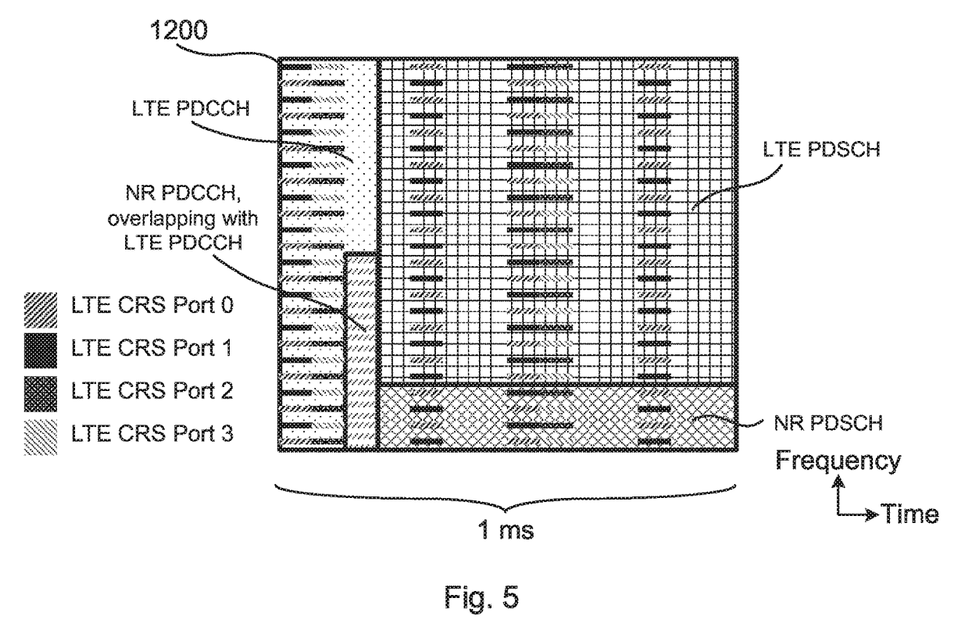
FIGS. 5 and 6 illustrate subframes for joint downlink NR and LTE transmission according to embodiments.
Figure 6:
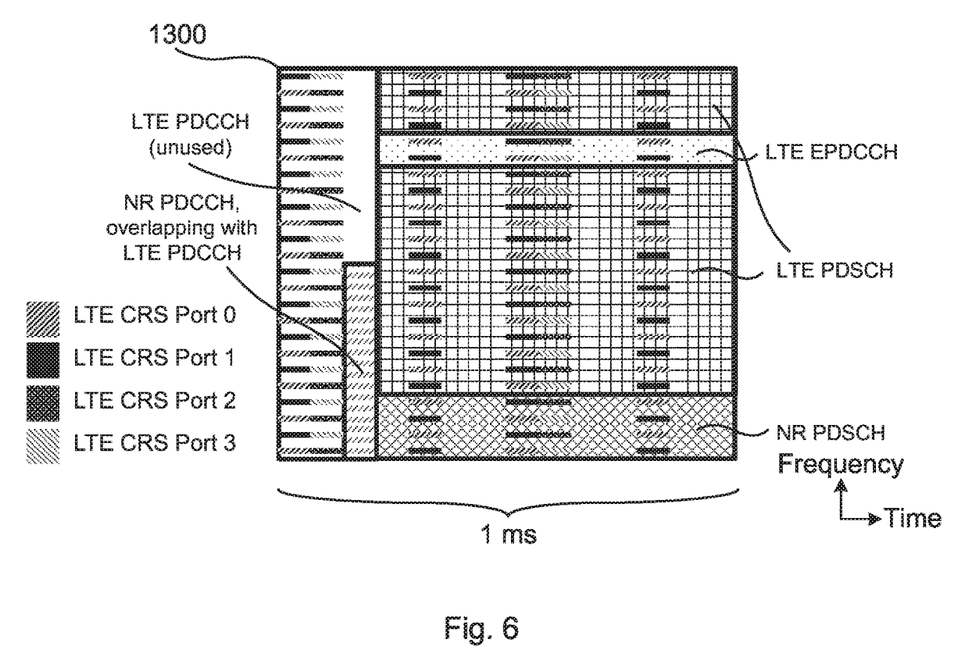

FIGS. 5 and 6 illustrate subframes 1200, 1300 for joint downlink NR and LTE transmission according to embodiments.

FIG. 5 shows a first example of downlink transmission with frequency spectrum sharing and overlapping of LTE PDCCH and NR PDCCH as herein disclosed. LTE PDCCH is scheduled in symbols 0 to 2, and NR PDCCH is scheduled in symbol 2 of the subframe 1200. Here, the LTE PDSCH can be transmitted also in the same frequencies (sub-carriers) where NR PDCCH is transmitted.

FIG. 6 shows a second example of downlink transmission with frequency spectrum sharing and overlapping of LTE PDCCH and NR PDCCH in a subframe 1300 as herein disclosed and where the downlink control information (DCI) for LTE is carried by EPDCCH. The LTE PDCCH region could thus be left be unused. The length of the LTE control region is signaled by the control format indicator (CFI) to include the NR PDCCH region. This means that LTE PDSCH will start in the symbol following the LTE control region including NR PDCCH, to avoid that NR PDCCH is blocking LTE PDSCH.

Figure 7:
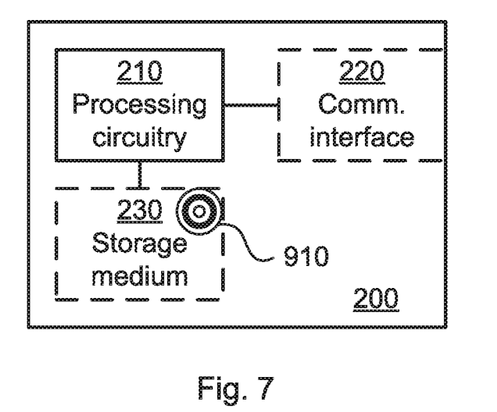
FIG. 7 is a schematic diagram showing functional units of a network node according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, devices, functions, and nodes of the communications network 100. As such the communications interface 220 may comprise one or more transmitters and receivers, comprising analogue and digital components. For example, the communications interface 220 might comprise, be collocated with, be integrated with, or be operationally connected to the co-sited antennas 140a, 140b.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
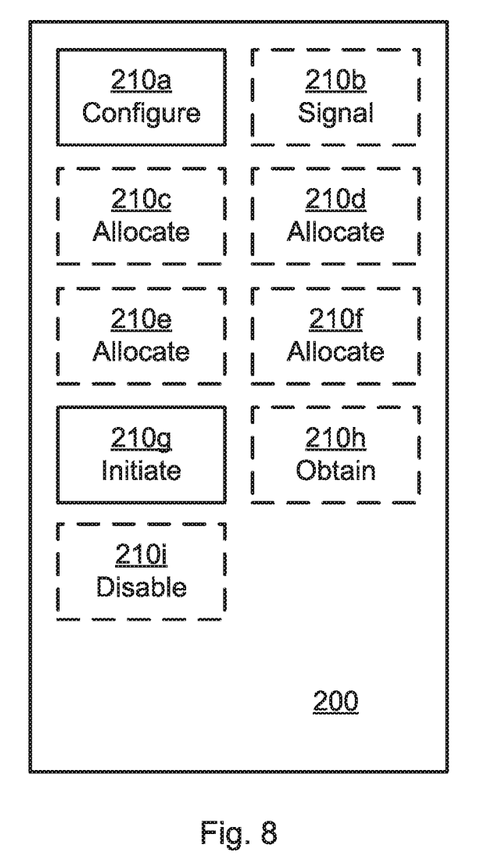
FIG. 8 is a schematic diagram showing functional modules of a network node according to an embodiment.

FIG. 8 schematically illustrates, in terms of a number of functional modules, the components of a network node 200 according to an embodiment. The network node 200 of FIG. 8 comprises a number of functional modules; a configure module 210a configured to perform step S102, and an initiate module 210g configured to perform step S112. The network node 200 of FIG. 8 may further comprise a number of optional functional modules, such as any of a signal module 210b configured to perform step S104, a first allocate module 210c configured to perform step S106a, a second allocate module 210d configured to perform step S106b, a third allocate module 210e configured to perform step S108, a fourth allocate module 210f configured to perform step S110, an obtain module 210h configured to perform step S114, and a disable module 210i configured to perform step S116.

In general terms, each functional module 210a-210i may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210i may be implemented by the processing circuitry 210, possibly in cooperation with the communications interface 220 and/or the storage medium 230. The processing circuitry 210 may thus be configured to from the storage medium 230 fetch instructions as provided by a functional module 210a-210i and to execute these instructions, thereby performing any steps as disclosed herein.

The network node 200 may be provided as a standalone device or as a part of at least one further device. For example, the network node 200 may be provided in a node of the radio access network 110 or in a node of the core network 120, as in FIG. 3. Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210a-210i of FIG. 8 and the computer program 920 of FIG. 9.

Figure 9:
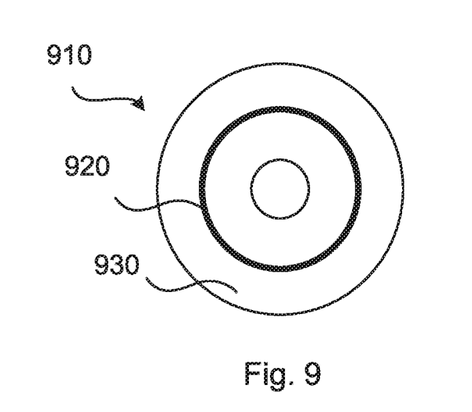
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

Figure 10:
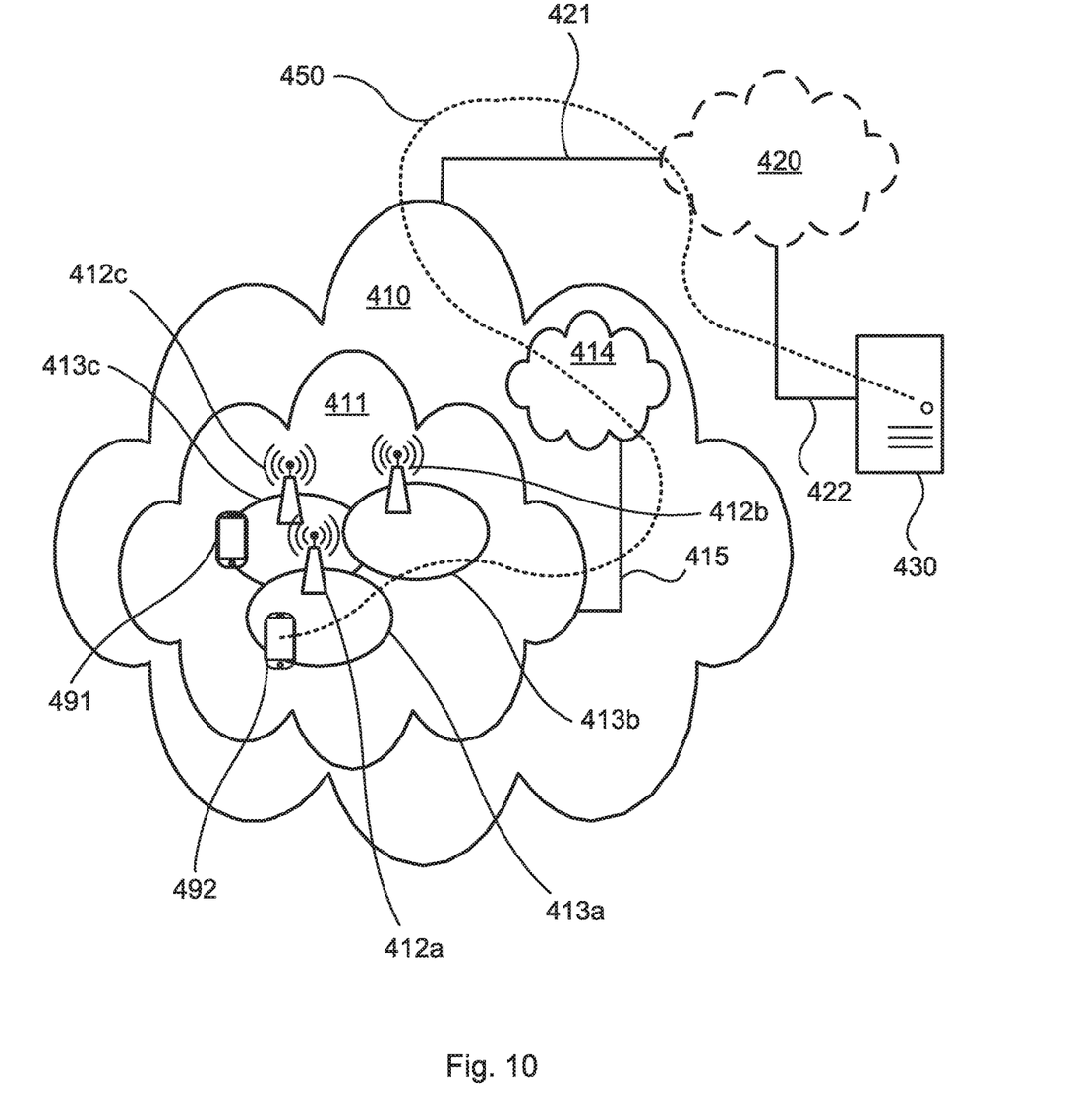
FIG. 10 is a schematic diagram illustrating a telecommunication network connected via an intermediate network to a host computer in accordance with some embodiments.

FIG. 10 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network 110 in FIG. 3, and core network 414, such as core network 120 in FIG. 3. Access network 411 comprises a plurality of radio access network nodes 412a, 412b, 412c, such as NBs, eNBs, gNBs (each corresponding to the network node 200 of FIG. 3) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second. UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal devices 150a, 150b, 150c of FIG. 3.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 11:
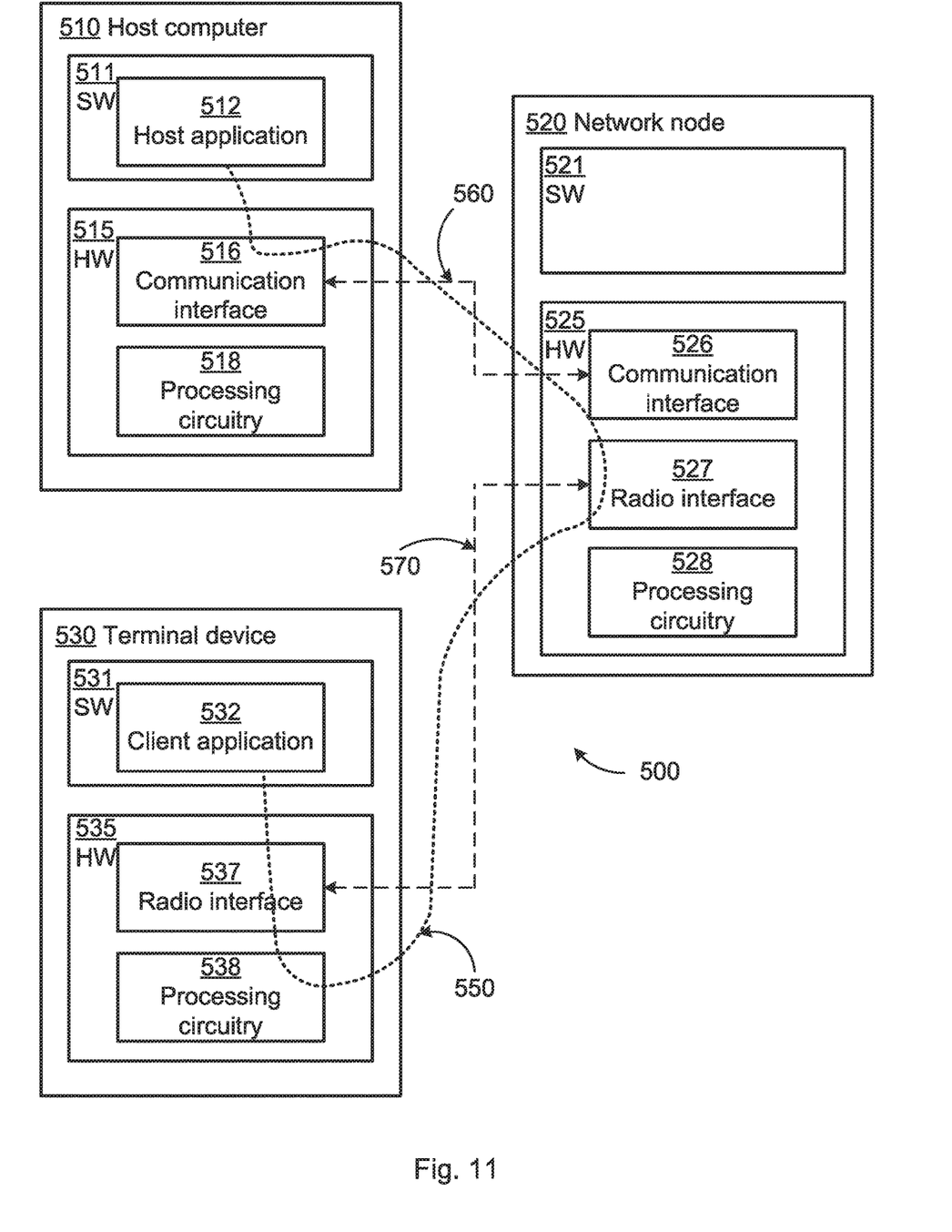
FIG. 11 is a schematic diagram illustrating host computer communicating via a radio base station with a terminal device over a partially wireless connection in accordance with some embodiments.

FIG. 11 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal devices 150a, 150b, 150c of FIG. 3. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 200 of FIG. 3. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by radio access network node 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 11 may be similar or identical to host computer 430, one of network nodes 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmission of New Radio (NR) control information in a Long Term Evolution (LTE) downlink subframe, wherein at least two symbols in the subframe are allocable for LTE control information, the method comprising a network node:
configuring resource elements for LTE transmission and resource elements for NR transmission within the subframe such that NR control information is allocated to resource elements of at least one symbol within the at least two symbols allocable for the LTE control information in the subframe; and
initiating transmission of the subframe from co-sited antennas, such that the resource elements for LTE transmission and the resource elements for NR transmission are transmitted from the co-sited antennas.

2. The method of claim 1, wherein the resource elements of LTE and the resource elements for NR transmissions are combined on each antenna of the co-sited antennas.

3. The method of claim 1, wherein the resource elements for LTE transmission are transmitted from a first antenna of the co-sited antennas and the resource elements for NR transmission are transmitted from a second antenna of the co-sited antennas.

4. The method of claim 1, wherein the resource elements configured with the NR control information occupy at least a last occurring symbol within the at least two symbols allocable for the LTE control information.

5. The method of claim 1, further comprising allocating LTE control information to resource elements of the at least two symbols allocable for the LTE control information.

6. The method of claim 5:
wherein each symbol is composed of sub-carriers; and
wherein the NR control information is allocated to resource elements of less than all sub-carriers of the at least one symbol.

7. The method of claim 6, wherein the LTE control information is truncated such that no LTE control information is allocated to resource elements of the sub-carriers of the at least one symbol to which the NR control information is allocated.

8. The method of claim 6, wherein transmission power of the LTE control information is scaled such that less transmission power is used for the LTE control information allocated to resource elements of the sub-carriers of the at least one symbol to which the NR control information is allocated than for the remaining LTE control information.

9. The method of claim 5, wherein more transmission power is used for some of the remaining LTE control information than for other of the remaining LTE control information.

10. The method of claim 1, wherein more transmission power is used for some of the NR control information than for other of the NR control information.

11. The method of claim 1, wherein no LTE control information is allocated to resource elements of the at least two symbols allocable for the LTE control information.

12. The method of claim 11, further comprising allocating enhanced LTE control information to resource elements of symbols within the subframe and outside the at least two symbols allocable for the LTE control information.

13. The method of claim 1, further comprising allocating downlink LTE data to resource elements of symbols within the subframe and outside the at least two symbols allocable for the LTE control information.

14. The method of claim 1, further comprising allocating downlink NR data to resource elements of symbols within the subframe and outside the at least two symbols allocable for the LTE control information.

15. The method of claim 13:
further comprising allocating downlink NR data to resource elements of symbols within the subframe and outside the at least two symbols allocable for the LTE control information;
wherein each symbol is composed of sub-carriers; and
wherein the NR downlink data is allocated to resource elements outside those sub-carriers to which the LTE downlink data is allocated.

16. The method of claim 15, wherein the sub-carriers for the NR downlink data have a spacing of 15 kHz, 30 kHz, or 60 kHz.

17. The method of claim 1, wherein three symbols are allocable for LTE control information in the subframe.

18. The method of claim 1, further comprising signaling how many symbols in the subframe that are allocable for LTE control information in the subframe.

19. The method of claim 1, wherein the LTE control information is provided in an LTE Physical Downlink Control Channel (PDCCH).

20. The method of claim 1, wherein the NR control information is provided in an NR Physical Downlink Control Channel (PDCCH).

21. The method of claim 1, further comprising:
obtaining an indication of prioritization of LTE transmission; and
temporarily disabling transmission of the NR control information while performing prioritized LTE transmission.

22. The method of claim 21, wherein the prioritization pertains to serving high priority LTE terminal devices, serving cell edge LTE terminal devices, or increasing number of served LTE terminal devices.

23. The method of claim 1, wherein the symbols are Orthogonal Frequency-Division Multiplexing (OFDM) symbols.

24. The method of claim 1, wherein the NR control information is allocated to resource elements of a single one symbol within the at least two symbols allocable for the LTE control information in the subframe.

25. A network node for transmission of New Radio (NR) control information in a Long Term Evolution (LTE) downlink subframe, wherein at least two symbols in the subframe are allocable for LTE control information, the network node comprising:
processing circuitry;
memory containing instructions executable by the processing circuitry whereby the network node is operative to:
configure resource elements for LTE transmission and resource elements for NR transmission within the subframe such that NR control information is allocated to resource elements of at least one symbol within the at least two symbols allocable for the LTE control information in the subframe; and initiate transmission of the subframe from co-sited antennas, such that the resource elements for LTE transmission and the resource elements for NR transmission are transmitted from the co-sited antennas.

26. A non-transitory computer readable recording medium storing a computer program product for controlling transmission of New Radio (NR) control information in a Long Term Evolution (LTE) downlink subframe, wherein at least two symbols in the subframe are allocable for LTE control information, the computer program product comprising software instructions which, when run on processing circuitry of a network node, causes the network node to:
- configure resource elements for LTE transmission and resource elements for NR transmission within the subframe such that NR control information is allocated to resource elements of at least one symbol within the at least two symbols allocable for the LTE control information in the subframe; and
- initiate transmission of the subframe from co-sited antennas, such that the resource elements for LTE transmission and the resource elements for NR transmission are transmitted from the co-sited antennas.

\* \* \* \* \*

UNITED STATES PATENT AND TRADEMARK OFFICE
CERTIFICATE OF CORRECTION

PATENT NO. : 11,159,206 B2
APPLICATION NO. : 16/485180
DATED : October 26, 2021
INVENTOR(S) : Huss et al.

It is certified that error appears in the above-identified patent and that said Letters Patent is hereby corrected as shown below:

In the Specification

Column 1, Line 23, delete "comparted" and insert -- compared --, therefor.

Column 5, Line 19, delete "network no" and insert -- network 110 --, therefor.

Column 7, Line 7, delete "information" and insert -- information. --, therefor.

Column 9, Line 66, delete "be left be" and insert -- be left --, therefor.

Column 11, Line 34, delete "of the of the" and insert -- of the --, therefor.

Column 12, Line 24, delete "second." and insert -- second --, therefor.

Column 13, Lines 46-47, delete "hardware 525" and insert -- hardware 525 of --, therefor.

Column 14, Line 59, delete "etc.; the" and insert -- etc. The --, therefor.

Signed and Sealed this
Twelfth Day of July, 2022

Katherine Kelly Vidal
*Director of the United States Patent and Trademark Office*